Dec. 19, 1933.  J. B. AUSTIN  1,940,573
PROCESS OF MANUFACTURING WELDING ELECTRODES
Original Filed July 6, 1929  2 Sheets-Sheet 1
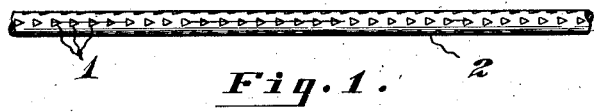
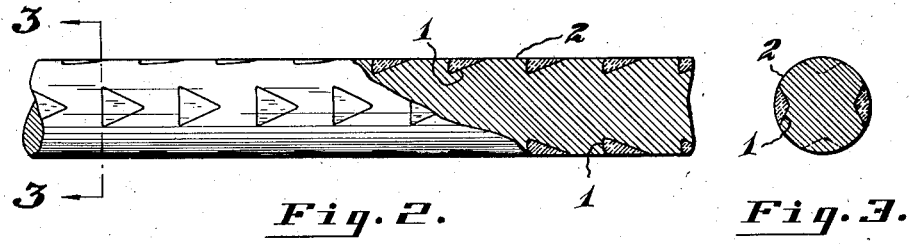
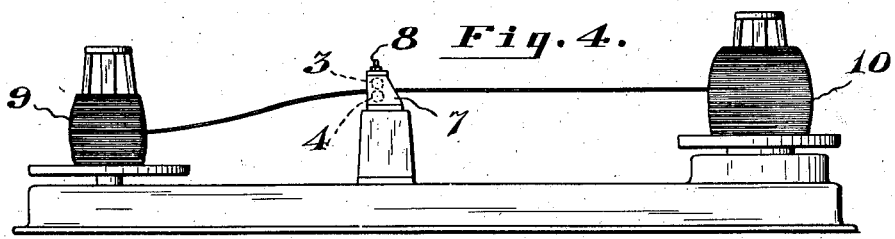
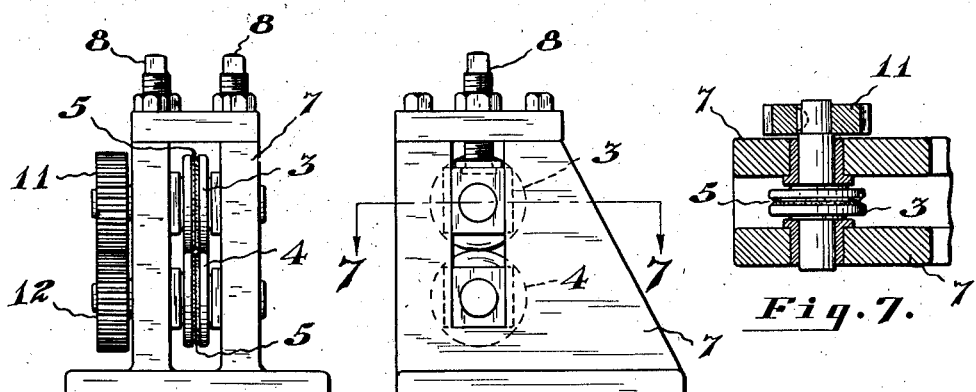
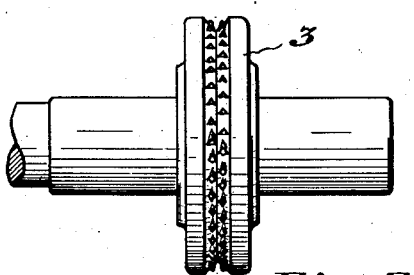
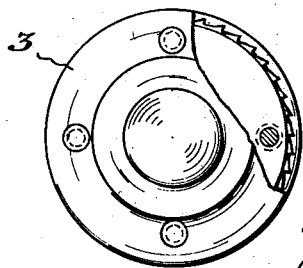
INVENTOR
John B. Austin
BY
Arnold C. Rood
ATTORNEY Dec. 19, 1933.   J. B. AUSTIN   1,940,573
PROCESS OF MANUFACTURING WELDING ELECTRODES
Original Filed July 6, 1929   2 Sheets-Sheet 2

INVENTOR
John B. Austin
BY
Arnold C. Rood
ATTORNEY

Patented Dec. 19, 1933

1,940,573

UNITED STATES PATENT OFFICE 1,940,573

PROCESS OF MANUFACTURING WELDING ELECTRODES

John B. Austin, Cleveland, Ohio, assignor to Una Welding, Inc., Cleveland, Ohio, a corporation of Delaware Application July 6, 1929. Serial No. 376,369
Renewed May 17, 1933

12 Claims. (Cl. 219—8)

This invention relates to the art of electric arc welding and more particularly to electrodes for use in electric arc welding.

An object of this invention is to provide an economical and advantageous method of producing a fluxed welding electrode having advantageous characteristics for use with either hand or automatic welding.

Another object of the invention is to provide a method for producing a welding electrode having uniform and predetermined amounts of fluxing material firmly secured to the outer surface of the rod.

Another object of my invention is to provide an advantageous method of producing a welding electrode in which fluxing material is disposed in depressions in the outer surface of a metal rod and which is capable of withstanding bending and rough handling in general without deterioration of said fluxing material or loosening thereof from the metal rod.

Another object of the invention is to provide an advantageous method of forming a fluxed welding electrode wherein the flux applying operation is combined with the drawing of the metal rod from which the welding electrode is formed.

Another object of this invention is to provide a method of forming a fluxed welding electrode wherein the fluxing material is employed also as a lubricant in the last drawing operation in the formation of the metal rod upon which said coating is to be disposed.

Other objects of my invention will be apparent to those skilled in the art from the following description and annexed drawings, in which Figure 1 is a fragmentary side elevation of a welding rod embodying the invention.

Fig. 2 is a fragmentary side elevation on an enlarged scale with a portion of the rod broken away and shown in section.

Fig. 3 is a section taken on the line indicated at 3—3 in Fig. 2.

Fig. 4 is a side elevation of the rod indenting apparatus.

Fig. 5 is a front elevation of the indenting rolls.

Fig. 6 is a side elevation of the indenting rolls.

Fig. 7 is a section taken on the line indicated at 7—7 in Fig. 6.

Fig. 8 is a front elevation of one of the rolls.

Fig. 9 is a side elevation of a roll with a portion broken away and shown in section.

My invention contemplates generally an advantageous and economical method of manufacturing welding electrodes, particularly of the type disclosed and claimed in my copending application Serial No. 246,369 filed Jan. 12, 1928, for Welding electrodes, wherein indentations or depressions are formed in the surface of a metal rod and fluxing material is disposed in said depressions and secured directly to the metal surface of the rod by a suitable binder. Such electrodes are described in detail in my said copending application.

By my present invention, I first form or dispose depressions in the surface of a metal rod and subsequently disposed fluxing material in said depressions, together with a suitable binder, said fluxing material and binder being preferably compressed into said depressions and the rod subsequently heated to dry said binder and cause the fluxing material to adhere firmly to said rod.

Figure 13:
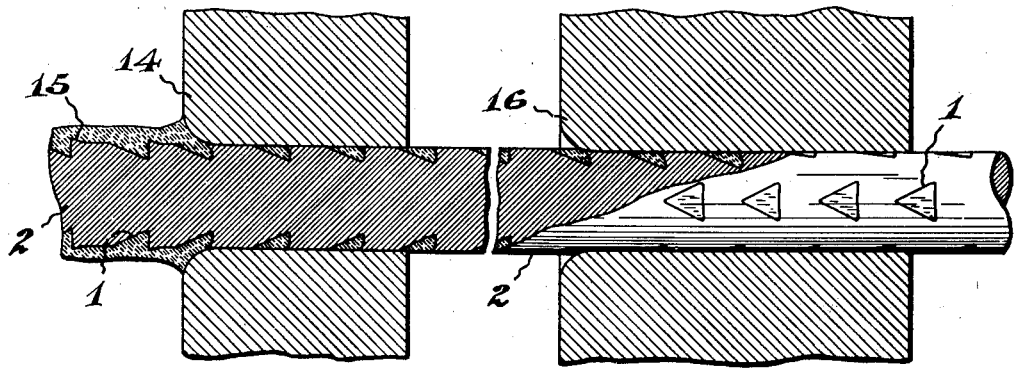
Fig. 13 is an axial section through the drawing dies showing the manner in which the fluxing material is applied to the rod.

The flux receiving depressions 1 in the metal rod 2 are preferably longitudinally and circumferentially discontinuous, as shown in Figs. 1, 2 and 13. The number and size of these depressions will, of course, depend upon the proportion of fluxing material to be associated with the metal rod and the proportion of fluxing material will depend upon the use to which the electrode is to be put, and upon the characteristics to be imparted to the arc and weld metal. The depressions may be of any suitable or desired shape or size and may be formed in the rod in any suitable manner, but I have found it convenient to dispose the depressions in a rod by a rolling operation performed on a rod drawn not quite to finished size. Thus, as illustrated in Figs. 4 to 11, the depressions may be formed by a pair of toothed rolls 3 and 4 provided with peripheral grooves 5 to receive the rod and with projecting teeth or barbs in the grooves.

The rolls 3 and 4 are mounted in a suitable stand 7 and the upper roll 3 may be adjusted toward and away from the lower roll 4 by means of screws 8 to vary the pressure on a rod passing through the rolls. In order to simplify the machining operations required for forming the barbs or teeth in the grooves of the rolls, each of the rolls is preferably formed in two halves which are rigidly secured together to form the complete roll. As shown in Fig. 4, the rod is fed from a suitable reel 9 through the rolls 3 and 4 and wound on a suitable wire drawing block 10. The rolls 3 and 4 are rotated by the wire as it is drawn through the rolls and relative slipping of the roll is prevented by intermeshing gears 11 and 12 fixed to the roll shafts. The projecting teeth or barbs on one side of the groove of each roll are preferably staggered with respect to the teeth on the opposite side of the groove to provide the staggered indentations 1 in the rod.

The rod which is thus provided with depressions may, of course, be of any suitable composition, ferrous or non-ferrous, depending upon the particular welding for which the rod is designed.

The fluxing material is preferably applied to the rod during the operation of drawing said rod down to final size. Thus referring to Fig. 12, I may dispose a reel of rod in which the depressions have been formed in a bath 13 containing fluxing material and a suitable binder in the form of a paste. Such fluxing material may comprise any of a variety of ingredients as disclosed in my copending application above referred to. As a specific example, the fluxing material may comprise 44 parts of calcium carbonate, and 7 parts of ferrous oxide. The binder may preferably comprise an aqueous solution of sodium silicate comprising, for example, 1 part of commercial sodium silicate diluted with 2 parts of water. One or more of the ingredients of the bath is preferably one which will serve as a lubricant in the drawing operation. Thus, I have found that sodium silicate, while moist, acts as a very satisfactory die lubricant.

As shown in Figs. 1, 2 and 13, the rod passing out of the flux bath may be first drawn through a die 14 to remove barbs or projections 15 formed in the indenting operation and then through a die 16 which reduces the diameter of the rod to its final size and compresses the fluxing material in the indentations. As shown in Fig. 13 of the drawings, the die bends the depressions downwardly, causing them to overhang the depressions which aids in retaining the flux in the depressions.

It will be noted that the rod is drawn through the dies 14 and 16 immediately after being withdrawn from the bath 13 before the flux coating can dry and in order that the sodium silicate or other ingredients of the fluxing paste may exert a lubricating action as the rod is drawn through the dies, no other lubricant being required for the drawing operation.

Figure 10:
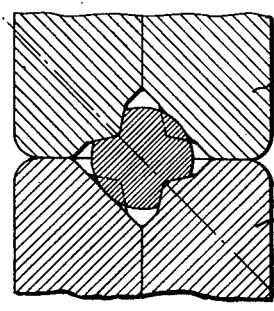
Fig. 10 is an axial section through the bight of the indenting rolls showing a rod between the rolls.
Figure 11:
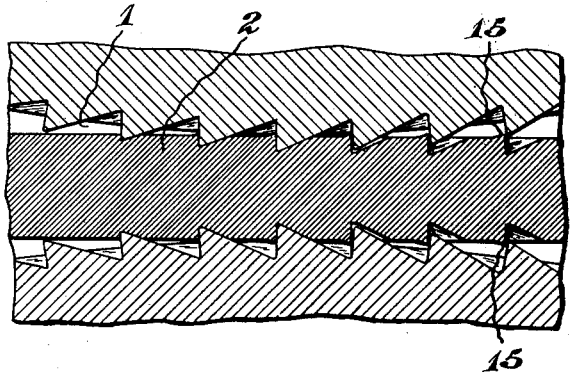
Fig. 11 is a section taken on the line indicated at 11—11 in Fig. 10.
Figure 12:
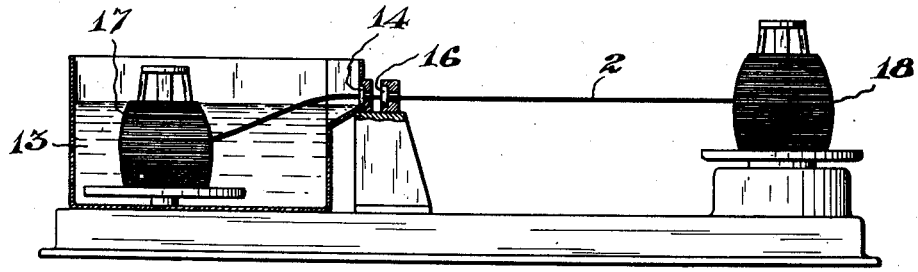
Fig. 12 is a side elevation of the flux applying apparatus with the flux tank and drawing dies shown in section.

As shown in Fig. 12, the rod is fed from a reel 17 in the bath 13 through the two dies 14 and 16 by means of a wire drawing reel 18 upon which the fluxed electrode rod is wound.

It will be noted that as a result of this drawing operation substantially all of the fluxing material is removed from the surface of the rod except that disposed in said depressions 1. A very slight amount of fluxing material, however, may remain upon the surface of the rod between the depressions.

I have found that the heat evolved in reducing the diameter of the rod 2 in the drawing die 16 serves to dry the fluxing material so that the electrode rod after emerging from the die 16 is a finished product and may be shipped or used directly.

Since substantially all of the fluxing material is removed from the surface of the rod during the drawing operation, it will be seen that I have provided an electrode which has an electrically conductive outer surface throughout the length thereof and which is well adapted for automatic as well as hand welding.

It will also be noted that I have provided a method of forming a welding electrode which involves but slight changes from the normal drawing operation in producing a rod of the desired size.

It will further be noted that I have provided an advantageous method of securing fluxing material directly to the dense metallic surface of a rod and at the same time providing said rod with an outer electrically conductive metallic surface.

It will also be apparent that by my invention, I have provided a method of manufacturing a rod capable of withstanding bending and rough handling without deterioration of the coating or loosening thereof from the metal rod and that I have provided a very simple and economical method of manufacturing a fluxed welding electrode suitable for either hand welding or automatic welding.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The process of manufacturing a welding electrode which comprises forming a plurality of discontinuous depressions in the surface of a metal rod, disposing lubricant containing fluxing material on the surface of said rod, subjecting said rod to sufficient rubbing compression to press down any metal portions projecting outwardly adjacent the edges of said depressions and subjecting said rod to further rubbing compression to reduce slightly the diameter of said rod.

2. The process of manufacturing a welding electrode which comprises producing a plurality of isolated depressions in the surface of a metal rod, disposing on the surface of said rod a die lubricant comprising a fluid binder together with a suspended fluxing material and subjecting said rod to sufficient rubbing compression to dry said fluid binder and causing the fluxing material in said depression to adhere directly to the dense metallic surface of said rod.

3. The process of manufacturing a welding electrode which comprises reducing the cross-section of a rod almost to the desired finished cross-sectional area, forming isolated depressions in the surface of said rod, disposing on the surface of said rod a suspension containing fluxing material and a die lubricant, and subjecting said rod to rubbing compression, whereby to reduce said rod to the desired finished cross-sectional area and remove from the surface of the rod substantially all the fluxing material not disposed in said depressions.

4. The method of forming a welding electrode, which comprises progressively notching a metal wire to form a series of isolated indentations in the surface thereof, each capable of receiving an appreciable amount of flux, passing said wire through a bath of flux whereby said depressions may be substantially completely filled therewith, said flux having the characteristics of a die lubricant, passing said flux-coated wire while the flux is still moist through a die whereby to smooth down any raised portions adjacent said indentations and to compact said flux within said indentations, and to draw said raised portions over said indentations to hold flux more securely therein, and subsequently passing said wire through a reducing die whereby the wire may be reduced to a final predetermined dimension to form a wire having flux-filled depressions and a bare surface between said depressions.

5. The method of forming a welding electrode which comprises progressively notching a metal wire to form a series of uniformly spaced notches of uniform size, passing the wire through a bath of fluxing material to apply flux thereto, and passing the flux coated wire through drawing dies to smooth out any irregularities in the surface of the wire while said flux is still moist so that it may act as a die lubricant wire, to compact substantially a predetermined quantity of flux in each indentation, and to dry the flux.

6. The method of forming a welding electrode which comprises associating a die-lubricating fluxing material with the surface of a notched metal rod, pressing said flux into said notches and the surface cores of said rod and simultaneously reducing the diameter of the rod, and utilizing the heat from the drawing operation to dry the flux, whereby a finished electrode will be produced.

7. The process of manufacturing a metallic welding electrode, which includes the step of passing a rod, having a series of isolated depressions formed in its surface, through a die to produce an overhanging portion of metal adjacent each depression, and thereby form a plurality of isolated pockets on the rod surface to retain flux.

8. That step in the method of making a fluxed welding electrode, which comprises forming overhanging portions adjacent each of a series of isolated depressions provided in the rod surface to assist in retaining flux in the depressions.

9. In the process of producing welding electrodes, the steps which comprise forming a series of isolated depressions in the surface of the electrode and then forcing the edges of the metal adjacent the depressions downwardly to form a portion which overhangs the depression, and which is adapted to aid in retaining flux in the depressions.

10. The process of manufacturing a metallic welding electrode, which comprises forming a series of depressions separated by projecting portions in the surface of the rod, and reducing the projecting portions to produce overhanging portions of metal adjacent the depressions, thereby forming a plurality of isolated pockets on the rod surface to retain flux, and providing bare metallic portions on the surface of the rod between said pockets.

11. The method of forming a welding rod, which comprises rolling a bare rod to form a plurality of longitudinally and circumferentially spaced depressions on its surface, filling the depressions with a fluxing material, pressing the fluxing material into the depressions, removing the excess fluxing material outside the depressions, thereby providing a substantially bare and electrically conductive surface, reducing the rod to a substantially uniform size throughout its length and forming overhanging portions on the rod surface adjacent each depression for assisting in retaining the fluxing material in the depressions.

12. The method of forming a welding rod, which comprises rolling a bare rod to form a plurality of longitudinally and circumferentially spaced depressions on its surface, filling the depressions with a fluxing material, pressing the fluxing material into the depressions, removing the excess fluxing material outside the depressions, thereby providing a substantially bare and electrically conductive surface and forming overhanging portions on the rod surface adjacent each depression for assisting in retaining the fluxing material in the depressions.

JOHN B. AUSTIN.